(12) United States Patent
Farmer et al.

(10) Patent No.: US 6,856,270 B1
(45) Date of Patent: Feb. 15, 2005

(54) PIPELINE ARRAY

(75) Inventors: Henry R. Farmer, Colchester, VT (US); David E. Lackey, Jericho, VT (US); Steven F. Oakland, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 10/768,835

(22) Filed: Jan. 29, 2004

(51) Int. Cl.[7] .............................................. H03M 1/38
(52) U.S. Cl. ..................................... 341/161; 711/169
(58) Field of Search ............................... 341/161, 159; 327/218, 141; 711/169, 109

(56) References Cited

U.S. PATENT DOCUMENTS

| | | | | |
|---|---|---|---|---|
| 5,227,790 A | * | 7/1993 | Shin et al. | 341/100 |
| 5,831,462 A | | 11/1998 | Witt | 327/199 |
| 5,920,899 A | * | 7/1999 | Chu | 711/169 |
| 6,064,246 A | * | 5/2000 | Endo et al. | 327/202 |
| 6,222,408 B1 | * | 4/2001 | Saeki | 327/271 |
| 6,247,134 B1 | | 6/2001 | Sproch | 713/320 |
| 6,438,681 B1 | | 8/2002 | Arnold | 712/216 |
| 6,466,066 B1 | | 10/2002 | Yoshikawa | 327/141 |
| 6,594,814 B1 | | 7/2003 | Jou | 716/18 |
| 6,633,995 B1 | | 10/2003 | Nam | 713/600 |
| 2002/0078334 A1 | | 6/2002 | Roth | 712/244 |
| 2003/0037226 A1 | | 2/2003 | Tsuruta | 711/228 |
| 2003/0065900 A1 | | 4/2003 | Mes | 711/169 |
| 2003/0131270 A1 | | 7/2003 | Abernathy | 713/322 |

OTHER PUBLICATIONS

"Priority scheme for allocation bus cycles to 1 of several simultaneous pipelines with input buffer FIFOs", Research Disclosure No. 456 Article 161, pp. 682–683 (Apr. 2002).
"Pipelined Memory Array Chip" IBM TDB, vol. 29 No. 7 pp. 3169–3170 (Dec. 1986).
John F. Wakerly "Digital Design Principles and Practices" Digital Design Principles & Practices, pp. 538–541, Prentice–Hall, third edition, (updated 2001).

* cited by examiner

*Primary Examiner*—Brian Young
*Assistant Examiner*—John B Nguyen
(74) *Attorney, Agent, or Firm*—William H. Steinberg

(57) ABSTRACT

A pipeline array includes a register, a pipeline clock input, and Narrow Pulse Triggered Latches (NPTL) stages connected in series. Each NPTL stage includes a Latch Pulse Generator (LPG) and a parallel set of single latches clocked by the LPG. The latches provide the parallel data input and the parallel data output of the stage. Each LPG provides a narrow latch clock pulse in response to a Pipeline Clock Pulse (PCP) supplied to the register and the last stage of latches. Each PCP arrives at each preceding LPG in the array after a delay provided by intervening time delay units. The delays increase for each preceding stage with the least delay at the penultimate stage and with the greatest delay at the first stage. The data input of the first stage is connected to the output of the register. The data input of the each of other stage is connected to the data output of the preceding stage in the array.

20 Claims, 7 Drawing Sheets

PIPELINE ARRAY

BACKGROUND OF THE INVENTION

1. Field of the Invention

This invention relates to buffer storage systems and more particularly to pipelined buffer storage systems and methods of operation thereof.

2. Description of Related Art

In many networked applications, it is necessary to buffer large amounts of data in a pipeline buffer. A pipelined buffer includes "N" hardware stages, where N is a positive integer, broken down into a series of memory registers connected in series for storing a sequence (line) of data bits temporarily passed from one register to the next, as in a bucket brigade. That is to say that data bits are moved in series from one memory register to the next register in the pipeline, one by one, with each register being replenished by the next data bit in line. Since the "N" stages operate substantially concurrently, a pipeline can operate faster than a non-pipelined system. A pipeline buffer is a First-In-First-Out (FIFO) buffer in which one "word" of data is written into the buffer and one "word" of data is read from the buffer on each clock cycle. The number of "words" stored in the buffer is a fixed value equal to the depth of the pipeline. For example, if the depth of the pipeline is N, the word written into the buffer at cycle "i" is read from the buffer substantially later at cycle "i+N". The word read from the buffer at cycle "i" was written into the buffer at cycle "i−N".

Referring to FIG. 1, a schematic circuit diagram is shown of a common, prior art pipeline buffer 7, which includes a set of N multi-bit registers $REG_1$ 10, $REG_2$ 11, $REG_3$ 12, ... $REG_{N-1}$ 13, and $REG_N$ 14, where N is a positive integer equal to the number of registers therein. Input data DATAIN [i] is submitted to the pipeline buffer 7 on input bus lines 8. The pipeline buffer 7 is configured as sets of multi-bit shift registers, where data is shifted from one of the sets of multi-bit registers 10–14 to the next set of multi-bit registers on each clock cycle, as shown in FIG. 1.

Each bit of each of the multi-bit registers 10–14 of FIG. 1 is typically implemented as a flip-flop. Since two latches are required to form each flip-flop, that means that a substantial area is required for each flip-flop. The same clock signal CL1 on line 9 clocks all of the multi-bit registers 10–14 in the pipeline buffer 7. Output data (DATAOUT[i]) is delivered from the last multi-bit register 14 on bus lines 15 simultaneously. It is noted that the data out from pipeline buffer 7 on bus lines 15 is defined by the relationship DATAOUT[i]=DATAIN[i−N].

There are two problems with the typical implementation of the type of pipeline buffer array 7 shown in FIG. 1, which are as follows:

1. Clock Skew Problems

First, in an Application Specific Integrated Circuit (ASIC) design environment, where flip-flop cells (e.g. registers 10–14) are automatically placed and routed, it is difficult to manage clock skew to avoid fast path (early mode) failures without adding a significant amount of delay into each register-to-register path.

2. Delays Caused by Excessive Chip Area Requirements

Secondly, added delays typically contribute to the second problem, which is that the chip area required by such a pipeline buffer array 7 can become quite large.

FIG. 2 shows a schematic circuit diagram of alternative prior art FIFO (First In First Out) buffer configuration 17 which utilizes a two-port memory array 23, consisting of a write port 24 for writing data to a selected write address and a read port 25 for reading data from a selected read address. A FIFO buffer typically also includes address counters and address comparison logic to detect when there is data in the FIFO buffer (read and write addresses are not equal) vs. when the FIFO buffer is "empty" (read and write addresses are equal).

An clock pulse 19 is applied to a register 20 which supplies an output on line 21 to node 21', which goes to incrementer 22 which adds a plus one (+1) to the register 20. The value on node 21' from register 20 passes through line 21 to the write address input to the memory array 23 and via the −N subtractor 25 through line 25' to the read address input to memory array 23. The input data (DATAIN[i]) is submitted on bus lines 18 to the data input of memory array 23 and data out (DATAOUT[i]) from the two-port memory array 23 is delivered to output bus lines 23' from the two-port memory array 23.

FIG. 2 shows a FIFO buffer that can easily be tailored to implement a pipeline buffer array 23. In the case of FIG. 2, a problem that needs to be solved is illustrated which is that the read and write addresses are always at a fixed difference, N, from each other (modulo M, where M is the number of words in the array).

The memory array implementation of FIG. 2 would solve the first problem, i.e. the clock skew problem, because of its regular, predetermined and pre-characterized layout. However, because of the overhead of address decoding logic and testability, the memory array implementation is larger than the flip-flop implementation unless the number of stages, N, in the pipeline is large ($\geq 16$), which is a problem in that excessive area on the chip is required.

Because typical applications require fewer than a dozen pipeline stages, an alternative implementation is required.

SUMMARY OF THE INVENTION

The advantage(s) of using the present invention are the combination of the benefits of the memory array (regular, predetermined, precharacterized layout) with the area advantages afforded by single latch storage elements instead of double latch flip-flops.

Furthermore, testability overhead (usually scanning) can be reduced.

In accordance with this invention, a system is provided comprising a pipeline clock generator for generating a series of wide (relatively long duration) Pipeline Clock Pulses (PCP)s and a pipeline clock line for receiving the series of wide PCPs. A register is provided having a register clock input, a register data input and a register data output. There are N Narrow Pulse Triggered Latch (NPTL) stages including N Latch Pulse Generators (LPG)s and N parallel sets of latches, with a parallel set of single latches for each stage, where N is a positive integer, including at least a first NPTL stage, a penultimate NPTL stage, and a last NPTL stage.

Each NPTL stage includes a latch and an LPG. The LPG is adapted to generate a latch clock pulse and includes a pipeline clock pulse input and an LPG pulse output. The latch includes a latch data input, a latch data output, and a clock input connected to the LPG pulse output of the LPG. The LPG pulse output is connected to trigger the latch when the LPG is activated by activation of the pipeline pulse input. Each latch data output is connected in series to a latch data input of a successive NPTL stage except that the latch data output of the last NPTL stage is connected as a pipeline data output. The latch data input of the first NPTL stage is connected to the register data output. The pipeline clock line is connected to the register clock input and the pipeline clock pulse input of the LPG of the last NPTL stage. There are N-1 time delay units. Each of the time delay units is connected to the pulse input of an LPG except for the last NPTL stage. Thus, the time delay units activate the LPGs in a bucket brigade fashion.

Preferably, the N-1 time delay units are connected in series with nodes connected therebetween. Each of the N-1 time delay units has a delay input and a delay output. There are a first time delay unit and a last time delay unit. The delay input of the first time delay unit is connected to the pipeline clock line. The delay output of the first time delay unit is connected to the LPG of the penultimate NPTL stage. The delay output of the last time delay unit is connected to the LPG of the first NPTL stage. Preferably, the delay output of one of the N-1 time delay units is connected to the pipeline clock pulse input of the LPG of each NPTL stage from the penultimate NPTL stage to the first NPTL stage.

Preferably, the N-1 time delay units have N-1 time delay unit inputs and N-1 time delay unit outputs, which are connected in series. The pipeline clock pulse input of each of the LPGs is connected to one of the N-1 time delay unit outputs aside from the last NPTL stage.

Preferably, the LPG of each NPTL stage includes a dual input AND circuit, which has a first input connected directly to the clock input of the latch of that NPTL stage. In addition, the AND circuit has a second input connected from the pipeline clock pulse input of that NPTL stage through a LPG delay circuit and an inverter.

In accordance with another aspect of the invention, a pipeline array includes a pipeline data input, a pipeline data output, and a pipeline clock line. A pipeline clock pulse generator for generating a series of wide Pipeline Clock Pulses (PCP)s connected to the pipeline clock line. An input register has a register data input connected to the pipeline data input. The input register also has a register data output and a register clock input connected to the pipeline clock line. There are N NPTL stages including N parallel sets of single latches with one parallel set of single latches for each stage, N Latch Pulse Generators (LPG)s and N-1 time delay units, where N is a positive integer. Each of the NPTL stages comprising a single latch having with a latch data input, a latch data output and a latch clock input and a LPG. Each LPG has an LPG input and an LPG output. The LPG output is connected to the latch clock input of that NPTL. Each LPG is adapted to provide a narrow trigger pulse in response to a PCP. The N NPTL stages include a first NPTL stage and a last NPTL stage. The register data output is connected to the latch data input of the first NPTL stage. The N latch stages are connected in series. The latch data output of each previous NPTL stage is connected to the latch data input of a successive NPTL stage except for the last NPTL stage which is connected to the pipeline data output. N-1 time delay units are connected in series to provide delayed clock signals to the LPGs except for the last NPTL stage. The LPG input of the last NPTL stage is connected to the pipeline clock line. Thus, the time delay units activate the LPGs to transfer data from a preceding NPTL stage to a successive NPTL stage in a bucket brigade fashion starting with the last NPTL stage and ending with the first NPTL stage during a single pipeline clock pulse.

DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1:
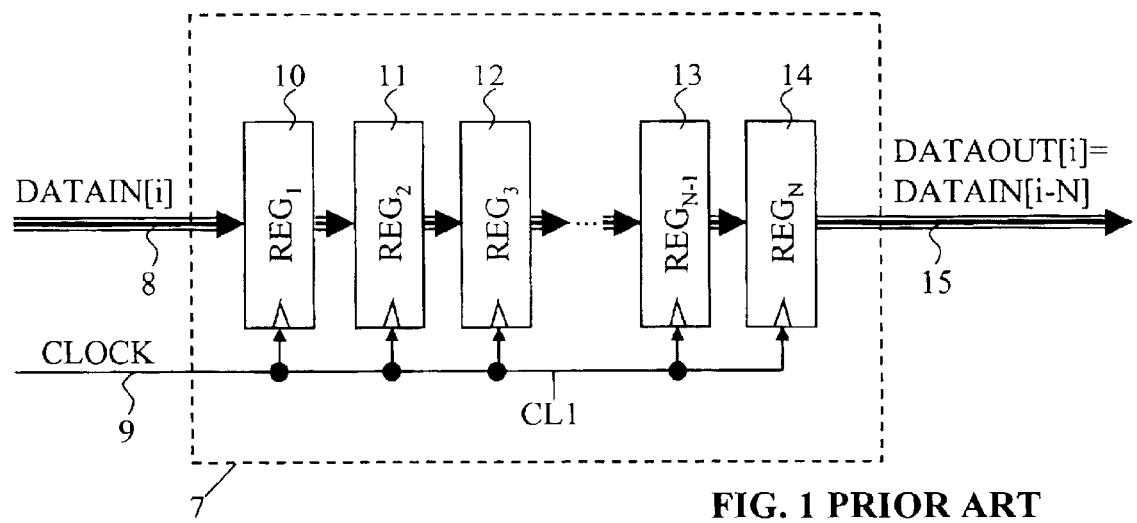
FIG. 1 shows the schematic circuit diagram of a prior art pipeline buffer.
Figure 2:
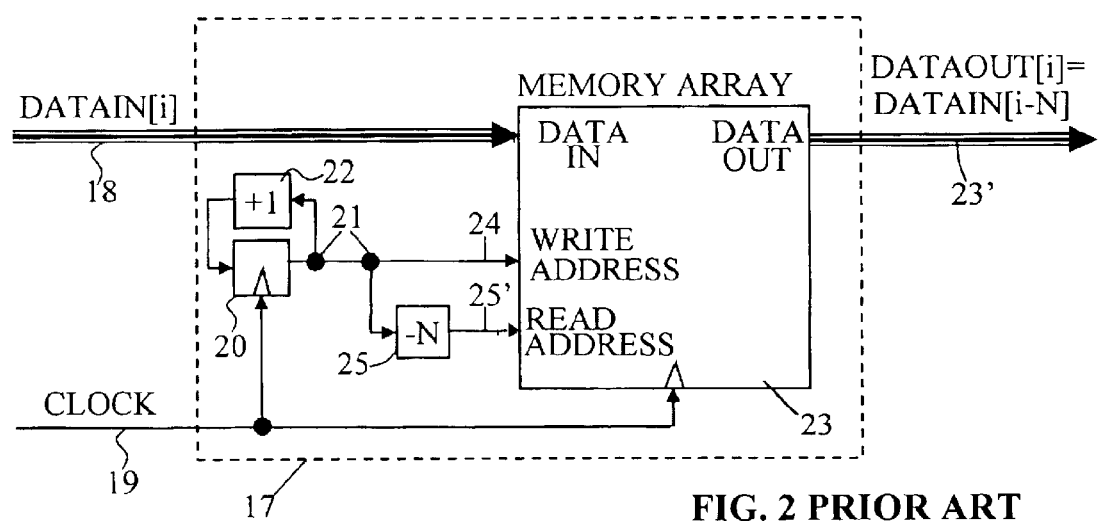
FIG. 2 shows a schematic circuit diagram of a prior art FIFO buffer configuration which utilizes a two-port memory array, consisting of a write port for writing data to a selected write address and a read port for reading data from a selected read address.
Figure 3A:
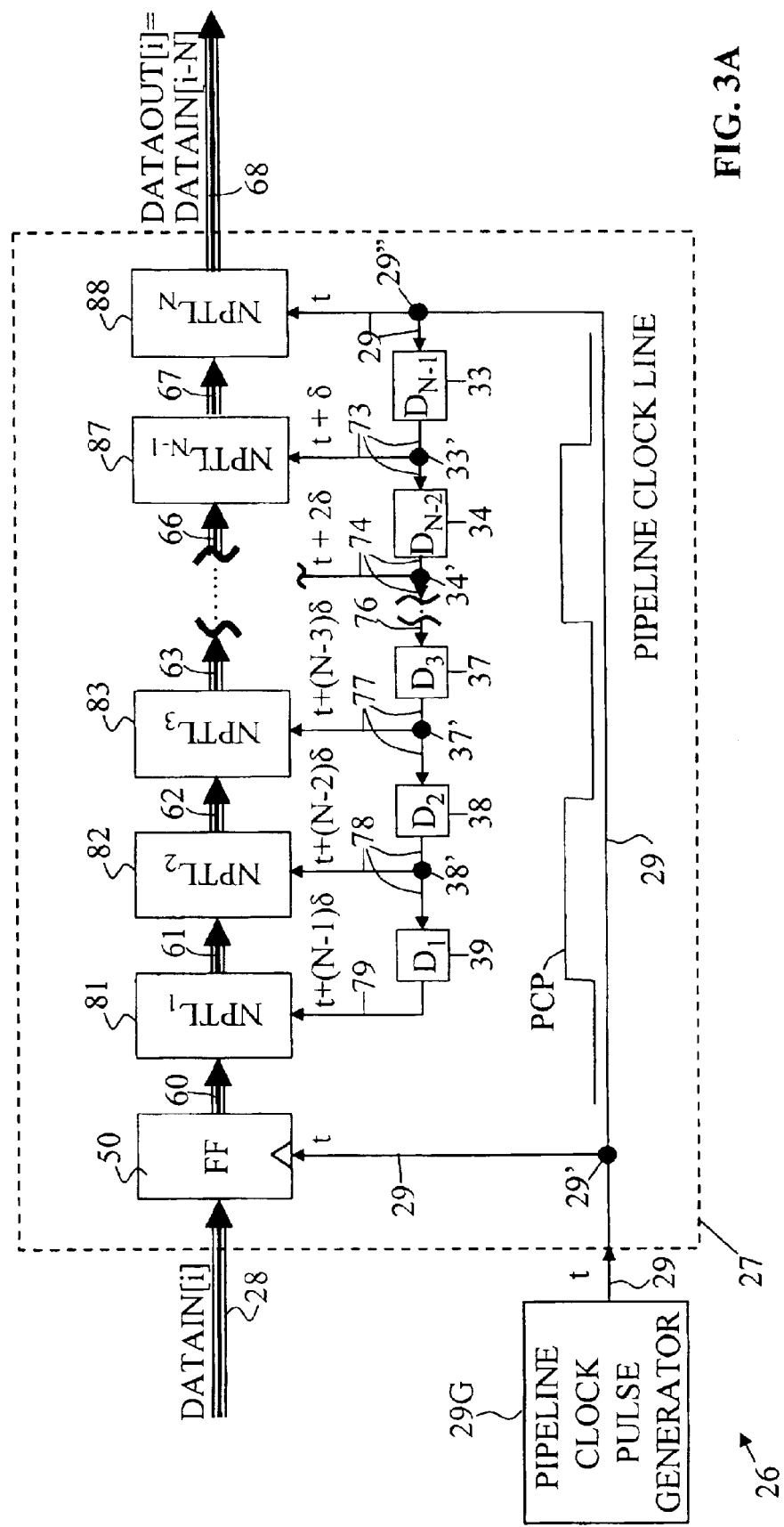
FIG. 3A is a schematic circuit diagram of a system in accordance with this invention, including a Pipeline Clock Pulse (PCP) generator and a pipeline buffer array including NPTL stages 1 to N of a set of Narrow Pulse Triggered Latches (NPTL), where N is a positive integer and a series of time delay units for delaying clock pulses from the pipeline clock Latch Pulse Generator (LPG).

FIG. 3A is a schematic circuit diagram of a system 26, in accordance with this invention including a Pipeline Clock Pulse (PCP) generator 29G and a pipeline buffer array 27 which receives Pipeline Clock Pulses (PCP)s from the PCP generator 29G. The pipeline buffer array 27 is formed by a register 50, and a set of cascade connected of N Narrow Pulse Triggered Latch (NPTL) stages 81, 82, 83, ..., 87, 88, and time delay units 33, 34, ..., 37, 38, 39 (where N is a positive integer). The pipeline buffer array 27 receives an input comprising multi-bit DATAIN[i] on bus lines 28. In addition, the pipeline buffer array 27 is clocked by the PCPs on a pipeline clock line 29 comprising a series of relatively wide PCPs (relatively long duration PCPs) from the PCP generator 29G. The DATAIN[i] bus lines 28 are connected to the data (D) input of the FF register 50. The FF register 50 preferably comprises a conventional multi-bit unit. An edge-triggered input is formed by a set of multiple edge triggered type-D flip-flop circuits. There is one type D flip-flop circuit for each of the multiple bits shown in FIG. 6 including latch 50' and latch 50" and an inverter 70, described in more detail below. Preferably, the type-D flip-flops are of the type described by John F. Wakerly "Digital Design Principles and Practices" Prentice Hall, page 540.

The FF register 50, which is the first stage of the pipeline 27, is followed by the $NPTL_1$-$NPTL_N$ series stages 81, 82, 83, . . . , 87, 88 connected in series with multiple bits in each of those N stages. Data flows from one NPTL stage to the next NPTL stage peristaltically, i.e. in a bucket brigade manner, in response to a series of delayed PCPs propagated in the reverse direction from the pipeline clock line 29 through the time delay units 33, 34, . . . , 37, 38, 39 to trigger each of the $NPTL_N$-$NPTL_1$ series stages 88, 87, . . . , 83, 82, 81 to receive data from the previous stage in that order, seriatim. Each PCP is supplied directly, without passing through a delay unit to the register 50 and to the last, $NPTL_N$ stage 88. Each PCP arrives at each preceding NPTL stage in the array 26 after a delay provided by intervening time delay units 33, 34, . . . , 37, 38, 39. The delays increase for each preceding stage with the least delay at the penultimate stage 87 and with the greatest delay at the first stage 81.

The PCP generator 29G supplies the underlayed, wide PCPs to all of the segments of pipeline clock pulse line 29. The PCPs pass through node 29' and segments of pipeline clock pulse line 29 to the clock input of the FF register 50. The PCPs also pass through the segments of pipeline clock pulse line 29, the node 29', and node 29" to the clock input of the last $NPTL_N$ stage 88, as well as, the input of $D_{N-1}$ time delay unit 33 which feeds delayed PCPs to the remainder of the NPTL stages 81, 82, 83, . . . , 87.

Figure 8:
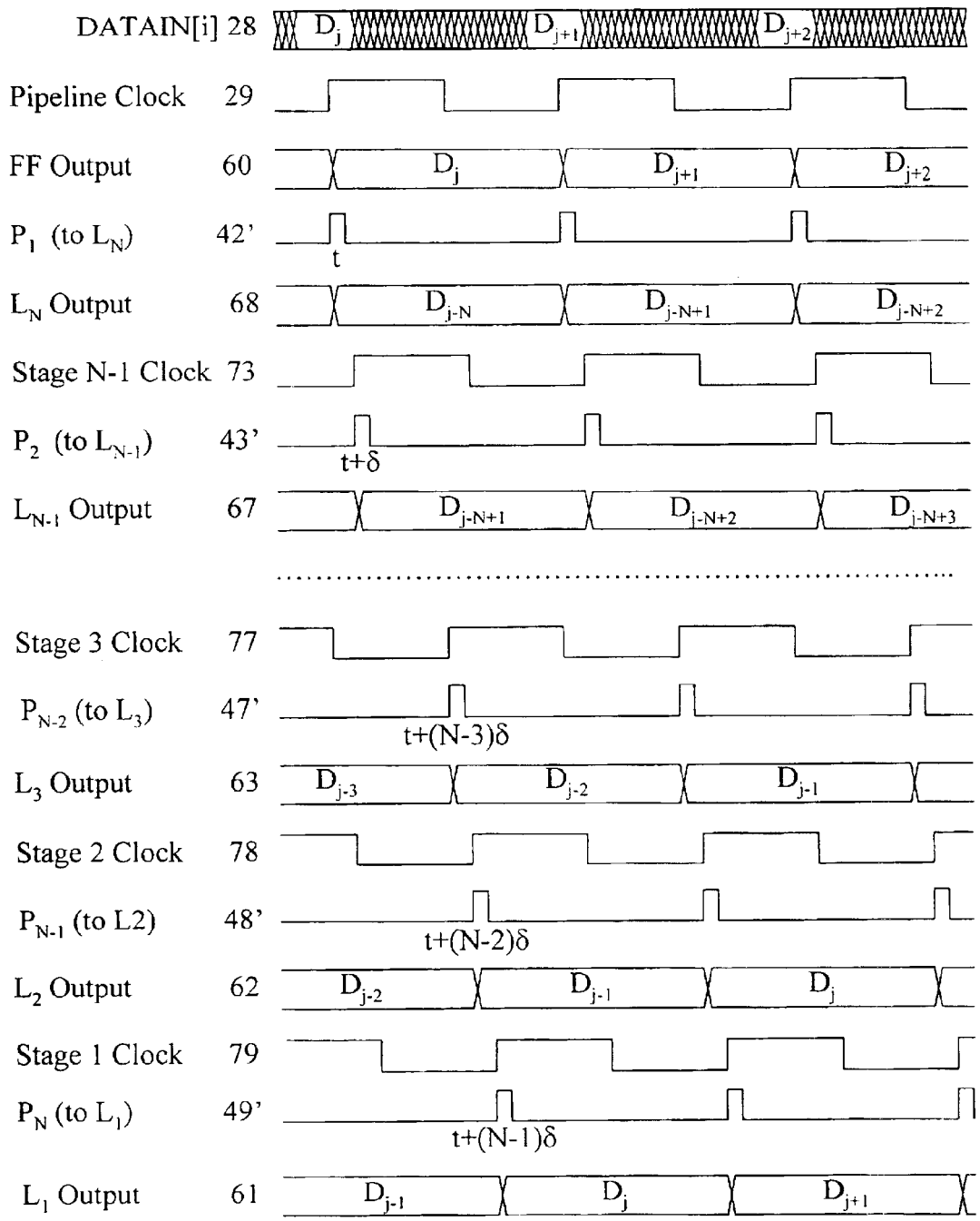
FIG. 8 is a timing diagram illustrating the sequence of events within the embodiment of FIGS. 3A, 3B, 4, 5A and 5B.

At time t, a PCP on line 29 causes the data input of register 50 to receive data on bus line 28. FIG. 8 shows the sequence of pulses and data transmission which starts at time "t". Note that the generation and the timing of a series of latch pulses $P_1, P_2, P_{N-2}, P_{N-1}, P_N$ shown in FIG. 8 is described below with respect to FIGS. 3B, 4, 5A and 5B.

At the same time, that initial, undelayed PCP on line 29 causes the $NPTL_N$ stage 88, which is the last stage in the array 27, to receive whatever data is stored in the penultimate stage, $NPTL_{N-1}$ stage 87 as shown by a first latch pulse $P_1$ in FIG. 8. Also at that time that initial, undelayed PCP on line 29 causes the $D_{N-1}$ time delay unit 33 to produce a delayed PCP on line 73, delayed by time δ (at time t+δ) as shown for pulse $P_2$ in FIG. 8.

At time t+δ, the delayed PCP on line 73 causes the penultimate $NPTL_N$ stage 87 in the array 27 to receive whatever data is stored in the previous $NPTL_{N-2}$ stage (not shown). The delayed PCP on line 73 causes the $D_{N-2}$ time delay unit 34 to produce a PCP delayed by time 2δ on line 74 delayed by an additional delay time "δ" (at time t+2δ). The stage connected to line 74 is not shown in FIG. 8 for convenience of illustration.

At time t+(N−3)δ, a delayed PCP on line 76 causes a $D_3$ time delay unit 37 to produce a PCP on line 77 that has been delayed by an accumulated delay time (N−3)δ on line 77 (at time t+(N−3)δ). That causes the $NPTL_3$ stage 83 to receive whatever data is stored in the previous, $NPTL_2$ stage 82 at time t+(N−3)δ, as shown for pulse $P_{N-2}$ in FIG. 8.

The delayed PCP on line 77 causes the $D_2$ time delay unit 38 to produce a PCP delayed by time (N−2)δ on line 78 delayed by an additional delay time "δ" at time t+(N−2)δ. That causes the $NPTL_2$ stage 82 to receive whatever data is stored in the previous $NPTL_1$ stage 81 (at time t+(N−2)δ), as shown for pulse $P_{N-1}$ in FIG. 8.

The delayed PCP on line 78 causes the $D_1$ time delay unit 39 to produce a PCP delayed by time (N−1)δ on line 79 delayed by an additional delay time "δ" at time t+(N−1)δ. That causes the $NPTL_1$ stage 82 to receive whatever data is stored in the previous stage, i.e. FF register 50 (at time t+(N−1)δ) as shown for pulse $P_N$ in FIG. 8.

Figure 3B:
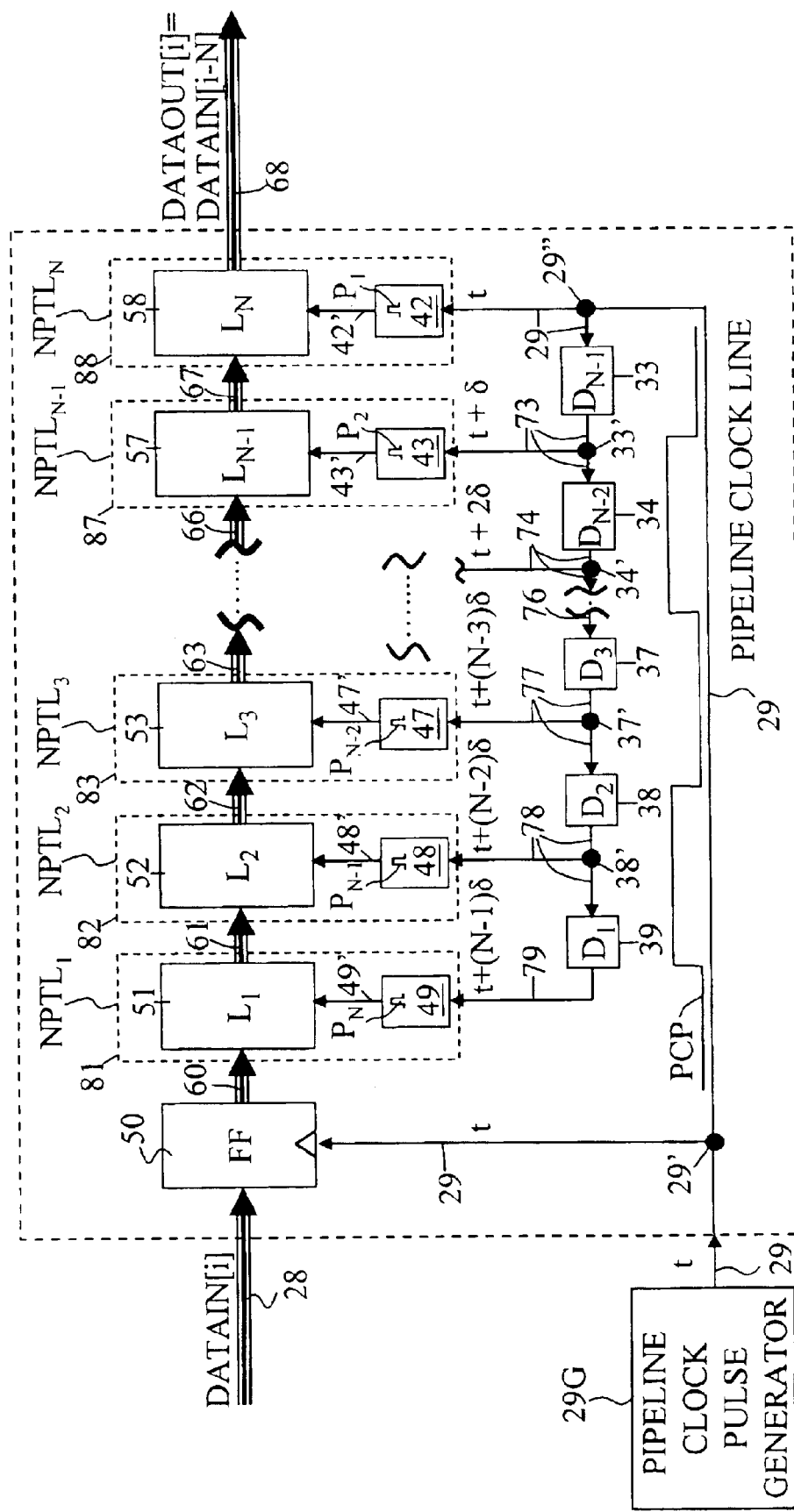
FIG. 3B is a more detailed schematic circuit diagram of the system of FIG. 3A in accordance with this invention, including the PCP generator, the time delay units and the pipeline buffer array with the buffer array including NPTL stages from 1 to N, with each stage is formed by a latch and an LPG for triggering clocking thereof.

FIG. 3B shows the system 26 of FIG. 3A in more detail with the components of the series of $NPTL_1$-$NPTL_N$ stages 81, 82, 83, . . . ,87, 88, which include a series of parallel sets of single latches including an $L_1$ parallel set of single latches 51, an $L_2$ parallel set of single latches 52, an $L_3$ parallel set of single latches 53, an $L_{N-1}$ parallel set of single latches 57 and an $L_{N-1}$ parallel set of single latches 58. A number of Latch Pulse Generators (LPG)s 42, 43, . . . , 47, 48 and 49 are also included to trigger the clock inputs of the parallel sets of latches 58, 57, . . . , 53, 52, 51 in that order, as will be described below.

The first $NPTL_1$ stage 81 is formed by the LPG 49, a line 49', and the $L_1$ parallel set of single latches 51. The input of LPG 49 is connected to line 79. The output of LPG 49 is connected by line 49' to the clock input of the $L_1$ parallel set of single latches 51. When the $L_1$ parallel set of single latches 51 is triggered, it latches data supplied to its data input on bus line 60. In response to the rise of a delayed PCP on line 79, the LPG 49 generates a latch pulse $P_N$ which passes through line 49' to trigger the $L_1$ parallel set of single latches 51 to latch data supplied from FF register 50 on bus line 60.

The second $NPTL_2$ stage 82 is formed by the LPG 48, a line 48', and the $L_2$ parallel set of single latches 52. The input of LPG 48 is connected to line 78. The output of LPG 48 is connected by line 48' to the clock input of the $L_2$ parallel set of single latches 52. When the $L_2$ parallel set of single latches 52 is triggered, it latches data supplied to its data input on bus line 61. In response to the rise of a delayed PCP on line 78, the LPG 48 generates a latch pulse $P_N$ which passes through line 48' to trigger the $L_2$ parallel set of single latches 52 to latch data supplied from $L_1$ parallel set of single latches 51 on bus line 61.

The third $NPTL_3$ stage 83 is formed by the LPG 47, a line 47', and the $L_3$ parallel set of single latches 53. The input of LPG 47 is connected to line 77. The output of LPG 47 is connected by line 47' to the clock input of the $L_3$ parallel set of single latches 53. When the $L_3$ parallel set of single latches 53 is triggered, it latches data supplied to its data input on bus line 62. In response to the rise of a delayed PCP on line 77, the LPG 47 generates a latch pulse $P_{N-2}$ which passes through line 47' to trigger the $L_3$ parallel set of single latches 53 to latch data supplied from $L_2$ parallel set of single latches 52 on bus line 62.

Then a gap is shown in the array followed by the $NPTL_{N-1}$ stage 87 that is formed by the penultimate clock LPG 43 and the penultimate $L_{N-1}$ parallel set of single latches 57.

The penultimate $NPTL_{N-1}$ stage 87 comprises the LPG 43, a line 43', and the penultimate, $L_{N-1}$ parallel set of single latches 57. The input of LPG 43 is connected to line 73. The output of LPG 43 is connected by line 43' to the clock input of the $L_{N-1}$ parallel set of single latches 57. When the $L_{N-1}$ parallel set of single latches 57 is triggered, it latches data supplied to its data input on bus line 66 from a previous parallel set of single latches ($L_{N-2}$ in a stage $NPTL_{N-2}$ not shown for convenience of illustration). In response to the rise of a delayed PCP on line 73, the LPG 43 generates a latch pulse $P_2$ which passes through line 43' to trigger the $L_{N-1}$ parallel set of single latches 57 to latch data supplied from the previous ($L_{N-2}$) parallel set of single latches on bus line 66.

At the end of the array, the last $NPTL_N$ stage 88 comprises the LPG 42, a line 42', and the penultimate, $L_N$ parallel set of single latches 58. The input of LPG 42 is connected to pipeline clock line 29. The output of LPG 42 is connected by line 42' to the clock input of the $L_N$ parallel set of single latches 58. When the $L_N$ parallel set of single latches 58 is triggered, it latches data supplied to its data input on bus line 67 from the previous $L_{N-1}$ parallel set of single latches 57. In response to the rise of an PCP on line 29 at time "t", which has not been delayed, the LPG 42 generates a latch pulse $P_1$ which passes through line 42' to trigger the $L_N$ parallel set of single latches 58 to latch data supplied from the previous $L_{N-1}$ parallel set of single latches 57 on bus line 67.

Next a description is provided of the timing of the series of the initial and delayed PCP latch pulses (between the beginning and the end of the duration of a given PCP), which latch pulses are applied to the various LPGs and latches. Initially, the last $L_N$ parallel set of single latches 58 receives a pulse $P_1$ on line 42' from the LPG 42 at time "t" in response to the PCP on line 29. Then, $L_{N-1}$ parallel set of single latches 57 receives the pulse $P_2$ on line 43' from LPG 43 at time t+δ in response to the arrival of the rise of the delayed PCP, which has been delayed by the time δ. Some time later, $L_3$ parallel set of single latches 53 receives pulse $P_{N-2}$ on line 47' from LPG 47 at time t+(N−3)δ, after the arrival of the rise of the PCP has been delayed by the time +(N−3)δ. A short time later, the $L_2$ parallel set of single latches 52 receives pulse $P_{N-1}$ on line 48' from LPG 48 at time t+(N−2)δ. Finally, the $L_1$ parallel set of single latches 51 receives pulse $P_N$ on line 49' from LPG 49 at time t+(N−1)δ.

In summary, the register 50, which is the first stage of the pipeline 27, is followed by the N $L_1$-$L_N$ parallel sets of single latches 51, 51, 53, . . . , 57, 58 in N NPTL stages 81, 81, 83, 87, 88 connected in series with multiple bits in each of those N stages. Data flows from stage to stage of the $L_1$-$L_N$ stages peristaltically, i.e. in a bucket brigade manner, in response to a series of delayed clock pulses propagated in the reverse direction from pipeline clock line 29 through the time delay units 33, 34, . . . , 37, 38, 39 to trigger each of the $L_N$-$L_1$ parallel sets of single latches 58, 57, . . . , 53, 52, 51 in that reverse order to receive data from the previous stage in that order, seriatim.

The initial PCP is supplied on line 29 to the input of the LPG 42 which generates the latch pulse $P_1$ on line 42' thereby triggering the last, $L_{N-1}$ parallel set of single latches 58, causing the $L_N$ parallel set of single latches 58 of NPTL$_N$ stage 88 to receive data from the previous stage $L_{N-1}$ parallel set of single latches 57 in NPTL$_{N-1}$ stage 87.

A delayed PCP, which was delayed by time "δ" by $D_{N-1}$ time delay unit 33, is supplied via node 33' on line 73 to the next to last (penultimate) stage NPTL$_{N-1}$ stage 87 in response to the PCP on line 29. That delayed PCP causes the LPG 43 to provide a latch pulse $P_2$ on line 43' triggering the $L_{N-1}$ parallel set of single latches 57 of the NPTL$_{N-1}$ stage 87 to receive data from the previous stage, which is not shown for convenience of illustration.

After the delay time of "δ" provided by the first delay unit 33, a delayed PCP from $D_{N-1}$ time delay unit 33 is supplied via node 33' to $D_{N-2}$ time delay unit 34. An even further delayed PCP, with a delay time of "2δ" is supplied via node 34' on line 74 by $D_{N-2}$ time delay unit 34 on line 74 to the next previous stage that would be NPTL$_{N-2}$, which is also not shown for convenience of illustration, which operates in like manner to the other stages, as will be well understood by those skilled in the art.

Now let us consider the input to line 76 which receives a substantially delayed PCP, which has been delayed by time (N−4)δ from the time t by N−4 delay units including delay units 33 and 34. Line 76 supplies that substantially delayed PCP to $D_3$ time delay unit 37 which causing the LPG 47 to generate latch pulse $P_{N-2}$, (after the delay time of (N−3)δ from time t) to trigger the $L_3$ parallel set of single latches 53 of NPTL$_3$ stage 83 to receive data from the previous stage $L_2$ parallel set of single latches 52.

The delayed PCP from $D_3$ time delay unit 37 is supplied via node 37' to $D_2$ time delay unit 38 at time (N−3)δ. Then the $D_2$ time delay unit 38 generates a delayed PCP causing the LPG 48 to generate latch pulse $P_{N-1}$ (after the delay time of (N−2)δ from time t) to trigger the $L_2$ parallel set of single latches 52 of NPTL$_2$ stage 82 to receive data from the previous stage $L_1$ parallel set of single latches 51.

The delayed PCP from $D_2$ time delay unit 38 is supplied via node 38' to $D_1$ time delay unit 39 which generates a delayed PCP,causing the LPG 49 to generate latch pulse $P_N$ after a delay time of (N−1)δ to trigger the $L_2$ parallel set of single latches 51 of NPTL$_1$ stage 81 to receive data from the register 50.

Reverse Sequence of Narrow Latch Clock Pulses

Figure 4:
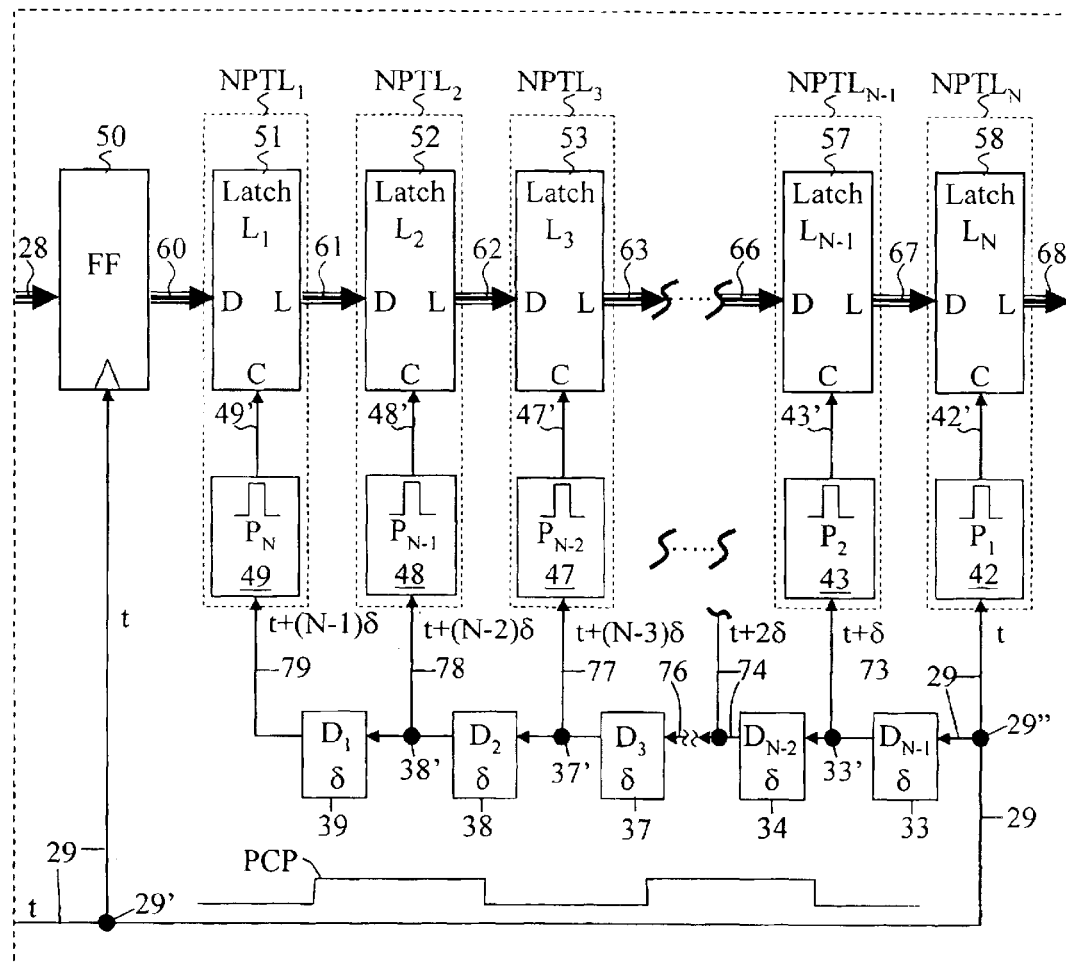
FIG. 4 is a more detailed schematic circuit diagram of the pipeline buffer array shown in FIG. 3B.

In FIG. 4, the pipeline buffer array 27 includes a N clocking LPGs 42, 43, . . . ,47, 48, 49 in the array provided to trigger operation of the N stages of multiple bit, parallel sets of single latches 58, 57, . . . , 53, 52, 51. Each of the LPGs 42, 43, . . . ,47, 48, 49 is activated to make a data transfer by a separate clock input supplied thereto at a successively later time by applying a narrow, latch clock pulse $P_1, P_2, \ldots P_{N-2}, P_{N-1}, P_N$ to the respective one of the N stages of multiple bit, i/e. parallel, sets of single latches 58, 57, . . . , 53, 52, 51 with which it is associated in a backward moving, i.e. reverse, sequence. That is to say that $L_N$ parallel set of single latches 58 is activated to transfer and receive data first, followed by $L_{N-1}$ parallel set of single latches 57, . . . followed by $L_3$ parallel set of single latches 53, followed by $L_2$ parallel set of single latches 52, followed by $L_1$ parallel set of single latches 51 which is in the first NPTL$_1$ stage 81 of the array 27.

Each cycle of narrow, latch clock pulses $P_1, P_2, \ldots P_{N-2}, P_{N-1}, P_N$ from the clocking network starts when the leading edge of a wide, PCP is received by the stage N LPG 42 on pipeline clock line 29. The narrow, latch clock pulse on the output line 42' from stage N LPG 42 is supplied to trigger the clock input of the multiple bit, parallel set of single latches 58 for the last stage N in the pipeline buffer array 27.

The triggering of the $L_N$ parallel set of single latches 58 is followed later, after a short time delay interval provided by delay $D_{N-1}$ circuit 33, by a narrow, latch clock pulse on line 43' to the multiple bit parallel set of single latches 57 of the next $L_{N-1}$ to the last NPTL$_{N-1}$ stage 88 in the pipeline buffer array 27. Each LPG 42, 43, . . . , 47, 48, 49 in succession, in that order, generates a narrow, latch clock pulse $P_1, P_2, \ldots P_{N-2}, P_{N-1}, P_N$ respectively to activate the corresponding one of the multiple bit, parallel sets of latches 58, 57, . . . , 53, 52, until finally LPG 49 applies an identical narrow, latch clock pulse $P_N$ on line 49' to the latch clock input of the multiple bit, parallel set of single latches 51 for stage 1 after the sum of N−1 intervals of delay provided by all of the $D_{N-1}, \ldots, D_3, D_2, D_1$ time delay units 33, . . . , 37, 38, 39 respectively.

Once for each rising clock edge of a pipeline clock signal, at time "t", on pipeline clock line 29, a new set of data bits is captured by the FF register 50. At approximately the same time "t", a pipeline clock signal on line 29 triggers the initial LPG 42 to generate the narrow, latch clock pulse $P_1$ on line 42' to trigger the $L_N$ parallel set of single latches 58 causing the set of data in $L_{N-1}$ parallel set of single latches 57 to be latched (copied) into the $L_N$ parallel set of single latches 58 which are in the $N^{th}$ NPTL stage of latches in the pipeline buffer array 27.

Then, at a later time, determined by the delay time of the first time delay unit $D_{N-1}$, it provides an output on line 73 which triggers the LPG 43 to supply a narrow, latch clock pulse $P_2$ on line 43' to the clock input of $L_{N-1}$ parallel set of single latches 57. As a result data from $L_{N-2}$ parallel set of single latches (not shown) is latched (copied) into $L_{N-1}$ parallel set of single latches 57.

Similarly, after subsequent delay intervals provided by time delay units not shown, data in each of the $L_i$ latches is copied into each corresponding one of the $L_{i+1}$ parallel set of single latches in response to a clocking pulse from the "i+1" stage LPG (not shown) to the in $L_i$ parallel set of single latches (not shown), etc. where "i" is a positive integer.

Subsequently, after its corresponding delay time, the time delay unit $D_3$ provides an output on line 77 after N–2 intervals of delay which triggers narrow LPG 47 to supply a narrow, latch clock pulse $P_{N-2}$ on line 47' to cause a set of data in $L_2$ parallel set of single latches 52 to be latched into $L_3$ parallel set of single latches 53.

Then a short interval later after a delay determined by time delay unit $D_2$, it provides an output on line 78 after N–1 intervals of delay which triggers narrow LPG 48 to supply a narrow, latch clock pulse $P_{N-1}$ on line 48' to cause a set of data in $L_2$ parallel set of single latches 52 to be latched (copied) into $L_2$ parallel set of single latches 53, in response to a clocking pulse from the third LPG 47 to the $L_{N-1}$ parallel set of single latches 57.

Finally after its corresponding delay time, time delay unit $D_1$ provides an output on line 79 after N intervals of delay which triggers LPG 49 to supply a narrow, latch clock pulse $P_N$ on line 49' to cause data in the input, FF register 50 to be latched (copied) into $L_1$ parallel set of single latches 51. Then, the pipeline buffer array 27 is ready to accept the next "word" of data at the input bus lines 28.

More specifically, for each rising clock edge on pipeline clock lines 29 that passes through to clock the FF register 50 (the flip-flop registers), starting at time t=0 new data on bus line 28 is captured into and that data is propagated therefrom on bus lines 60 to the proximal $L_1$ parallel set of single latches 51 in the pipeline array 27. Subsequently, the $L_1$ parallel set of single latches 51 latches that data, but only when it is enabled by a latch clock pulse on latch clock pulse input line 49' to $L_1$ parallel set of single latches 51. The latch clock pulse on latch clock pulse input line 49' to $L_1$ parallel set of single latches 51 will occur after the time delay provided by all of the $D_{N-1}, \ldots, D_3, D_2, D_1$ time delay units 33, 37, 38, 39, as explained in detail above.

Figures 5A, 5B:
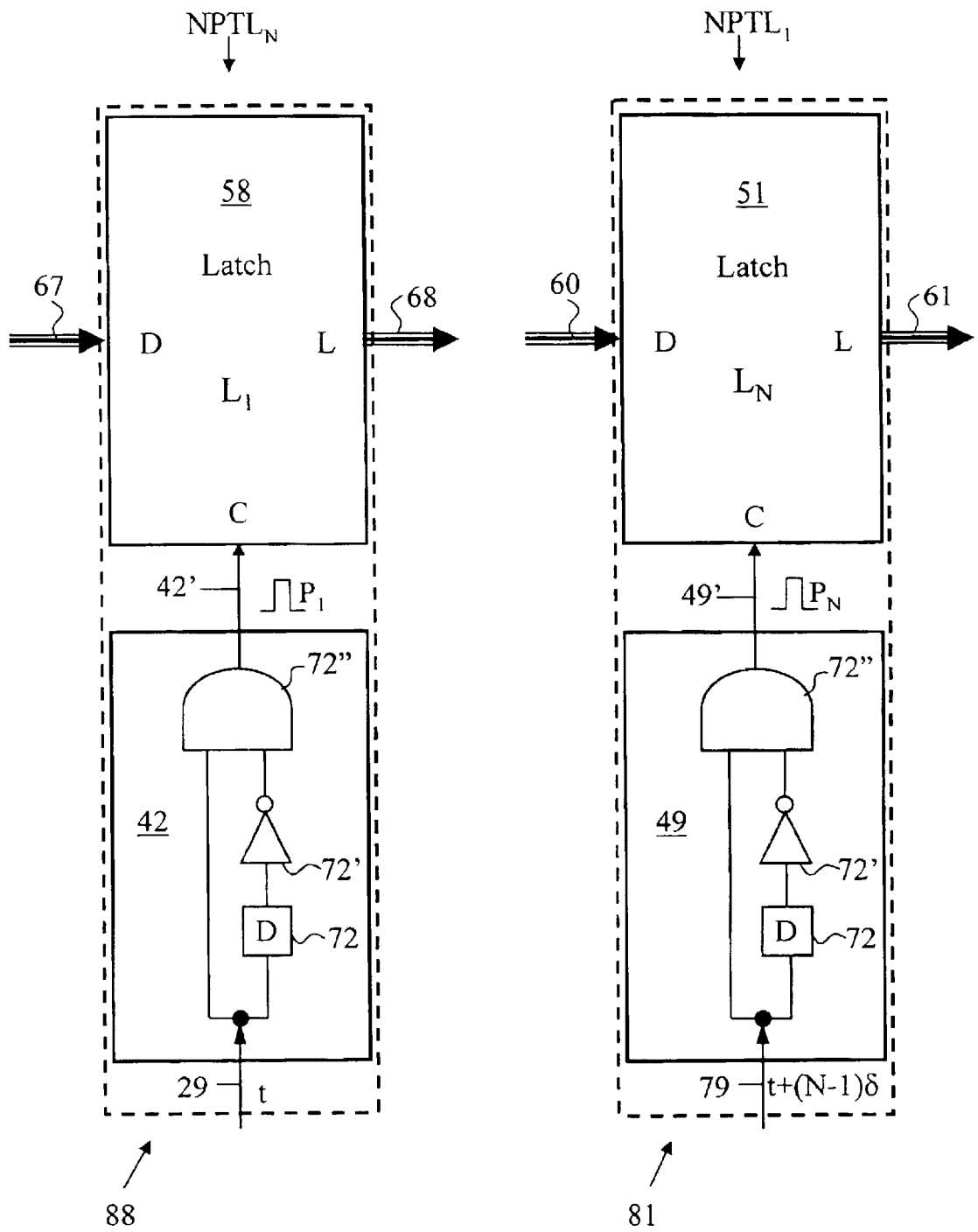
FIG. 5A is a schematic diagram of the $N^{th}$ NPTL in the pipeline buffer array of this invention employed in FIGS. 3A, 3B and 4, including a single latch from the last, $N^{th}$ parallel sets of single latches and the first LPG in the array.
FIG. 5B is a schematic diagram of the $1^{st}$ NPTL in the pipeline buffer array of this invention employed in FIGS. 3A, 3B and 4, including a single latch from the first parallel sets of single latches and the last $(N-1)^{th}$ LPG in the array.

Referring to FIGS. 3B, 5A and 8, at time t=0 the rising clock edge on the pipeline clock lines 29 also causes the distal LPG 42 to create a narrow, latch clock pulse $P_1$ on the latch clock pulse input line 42' to the distal $L_N$ parallel set of single latches 58 in the pipeline 27, latching the data on the bus lines 67 from the $L_{N-1}$ parallel set of single latches 57 into the $L_N$ parallel set of single latches 58. The new data in the $L_N$ latch 58 is immediately propagated from the distal $L_N$ parallel set of single latches 58 to the distal output bus lines 68 of the pipeline buffer 27.

After a time delay D determined by the time delay unit 33, clock input 73 to the LPG 43 rises, causing the LPG 43 to create a narrow, latch clock pulse on the latch clock pulse input line 43' at time t=t+δ, latching the data on the lines 66 into the $L_{N-1}$ parallel set of single latches 57. The new data in the $L_N$ parallel set of single latches 57 is propagated to the bus lines 67. Similarly, the parallel set of single latches $L_i$ are successively updated with new data from the parallel set of single latches $L_{i-1}$ until finally the parallel set of single latches $L_1$ 51 is updated with the data on the lines 60 from the FF register 50 at an approximate time t=t+(N–1)δ, where each stage provides a time delay of about "δ".

FIG. 5A is a schematic diagram of $L_1, L_2, L_3, \ldots, L_{N-1}$, and $L_N$ type-D parallel sets of latches 51, 52, 53, 57 and 58, which are substantially identical to each other of the kind employed in FIG. 3. The type-D latches are of the type described by John F. Wakerly "Digital Design Principles and Practices" Prentice-Hall, Third Edition, (updated 2001) at pages 538–541, where it is stated at page 540 that "A positive-edge-triggered D flip-flop combines a pair of D latches . . .". When the latch clock line 42' is high at the time of the narrow, latch clock pulse $P_1$, input data on bus line 67 is propagated to output bus line 68. Later, when latch clock line 43' is high at the time of pulse $P_2$, input data on bus line 66 is propagated to output bus line 67. Substantially later, when the latch clock line 47' is high at the time of the pulse $P_{N-2}$, input data on the bus line 62 is propagated to the output bus line 63. Still later, when the latch clock line 48' is high at the time of the pulse $P_{N-1}$, input data on the bus line 61 is propagated to the output bus line 62.

Finally, when the latch clock line 47' is high at the time of pulse $P_N$, input data on the bus line 60 is propagated to the output bus line 61. Note that, for example when the latch clock line 49' is high at the time of pulse $P_N$ input data on bus line 61 is propagated to the output bus line 62. Finally, when the latch clock line 47' is high at the time of pulse $P_N$, input data on bus line 60 is propagated to output bus line 61.

Note that, for example when the latch clock line 49' is high in response to generation of the latch clock pulse $P_N$, input data 60 is propagated by the $L_1$ parallel set of single latches 51 to output 61. On the other hand, when latch clock line 49' is low, output 61 is held to its previous logic state. This circuit is known in the art as a transparent latch. The $L_2, L_3, \ldots, L_{N-1}$, and $L_N$ parallel sets of latches 52, 53, 57 and 58 operate in the same way.

FIG. 5A is a representative logic diagram of the combination of an LPG 42 and a single latch representative of the parallel set of single latches 58, of the $NLTL_N$ stage 88, which are identical to the other LPGs 43, . . . , 47, 48, and 49 and parallel sets of latches 57 . . . , 53, 53, and 51 shown in FIGS. 3B, and 4.

The LPG 42 is adapted to generate a narrow, latch clock pulse in response to the leading edge of a clock signal consists of a time delay unit 72, an inverter 72' and an AND gate 72". The AND gate 72" has one of its two inputs connected to the pipeline clock line 29. The time delay unit 72 also receives its input on pipeline clock line 29, and in turn supplies its output to inverter 72', which then supplies its output to the other input of and gate 72". While the input on the pipeline clock line 29 is low, output line 42' from the LPGs 42 is low. In response to a rising transition of the input on the pipeline clock line 29, the output line 42' goes high for a short period of time determined by the time delay unit 72 and then the output line 42' returns low.

The LPGs 42 43, . . . , 47, 48, and 49 are logic units known in the art as a Pulse Generators (PG)s and are referred to herein as an LPGs since they are connected to trigger the respective clock inputs of the parallel sets of latches 58, 57, . . . , 53, 52, 51. The short period of time of each of the narrow, latch clock pulses $P_1, P_2, \ldots P_{N-2}, P_{N-1}, P_N$ is about an order of magnitude shorter than the wide PCPs on line 29 and the delayed PCPs on the lines, 73, 77, 78, and 79 as seen on FIG. 8.

FIG. 5B shows the structure of the latch 51 which is a single latch representative of a set of parallel latches in $NLTL_1$ stage 81 and the clock LPG 49 of the $NLTL_1$ stage 81 which has identical components and operates in an analogous fashion to the circuits of FIG. 5A, as do the other NPTL stages 82, 83, and 87, which will be well understood by those skilled in the art.

In response to each PCP, all of the resultant, latch clock pulses $P_1, P_2, \ldots P_{N-2}, P_{N-1}, P_N$, that are narrow relative to the wide PCPs, are generated before the next PCP is generated on line 29. Thus, the sequence of data transfers from the parallel set of single latches $L_1$ to parallel set of single latches $L_N$, propagated by the bucket brigade function, is completed before the next bucket brigade sequence begins. In other words the sum of the time delays provided by the time delay units 33, 34, ..., 37, 38 and 39 is less than the duration of a PCP on line 29 as shown in FIG. 8.

Figure 6:
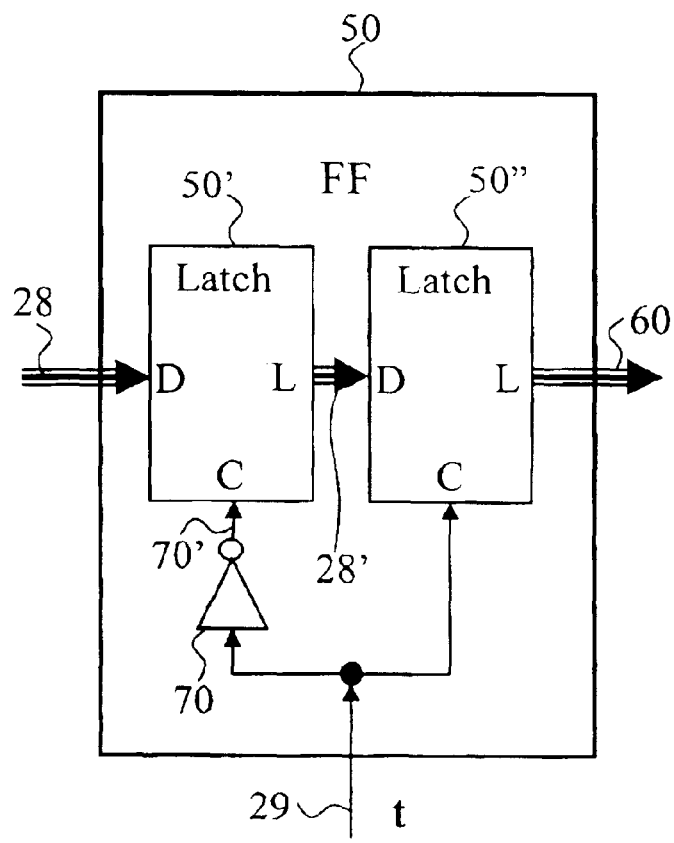
FIG. 6 is a schematic diagram of a single bit of the input register, i.e. a flip-flop register of the kind seen in FIGS. 3A, 3B, and 4.

FIG. 6 is a schematic block diagram of a single bit shows diagram of a type-D FF (flip-flop) register 50 of the kind shown in FIGS. 3A, 3B, and 4. On the rising edge of the CLOCK input on pipeline clock input line 29, at time "t", input data on input bus line 28 is captured and propagated to output bus lines 60 from FF register 50. The FF register 50 is known in the art as a type D flip-flop. The FF register 50 comprises a first latch 50', a second latch 50", and an inverter 70.

The latch 50' is connected to receive data from the input lines 28 at its data input D. The latch output L of the first latch 50' is connected by line 28' to the data input D of the second latch 50". The pipeline clock input line 29 is connected through inverter 70 to the clock input of the first latch 50', and the clock input of the second latch 50". When the pipeline clock signal on line 29 is low it causes the inverter 70 to provide a high output on line 70' to the clock input of the first latch 50', which latches data on bus line 28. When the pipeline clock signal on line 29 is high it raises the clock input to the second latch 50' causing it to latch data on lines 28' from the output L of the first latch 50'.

Figure 7:
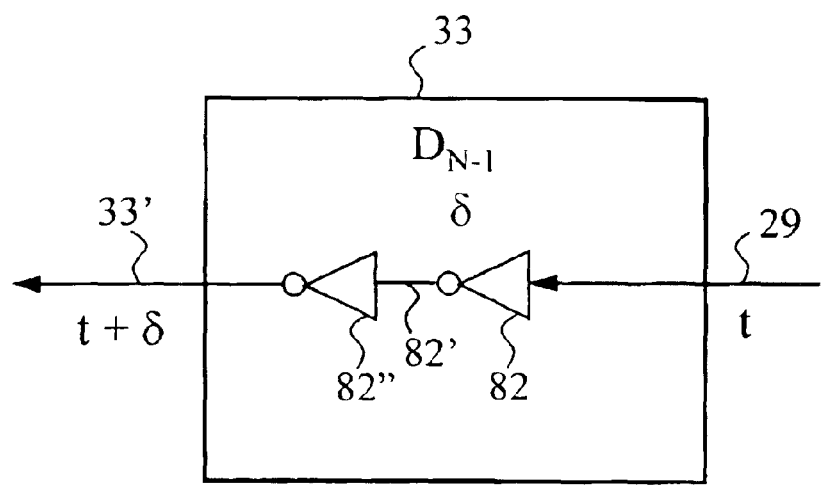
FIG. 7 is a representative schematic diagram of a representative time delay unit of the kind employed in FIGS. 3A, 3B, and 4.

FIG. 7 is a representative schematic diagram of the time delay unit 33, which is identical to the other time delay units 34, ..., 37, 38, and 39 of the type shown in FIG. 3. A transition at the input, which is the pipeline clock line 29, causes a like transition at the output of the delay unit 33 on line 33' after a time delay determined by various parameters known in the art, such as transistor size, voltage, and temperature. The time delay unit 33 comprises two inverters 82 and 82" connected in series. The pipeline clock line 29 is connected to the input of inverter 82 and the output of inverter 82 is connected by line 82' to the input of inverter 82". The output of the inverter 82" is supplied to the output line 33' of the time delay unit 33. The delay provided by the time delay unit 33 is a function of the time required for the two inverters 82/82" to switch from low to high for inverter 82 and for the inverter 82" to switch from high to low.

FIG. 8 is a timing diagram illustrating the sequence of events within the system of FIGS. 3A, 3B, 4, 5A and 5B. It can be seen that the pipeline clock is a square wave that produces the FF output of data $D_j$ at time t. The clock 29 also generates narrow, latch clock pulses $P_1$ pulse on line 42' which produces the $L_N$ output of data $D_{j-N}$, at time t. Then the time delay unit $D_{N-1}$ generates a delayed clock signal on the line 73 generating a $P_2$ pulse on line 43' at time t+δ. The $P_2$ pulse on line 43' produces the $L_{N-1}$ output of data $D_{j-N+1}$ at time t+δ.

The stage 3 delayed clock signal on line 77 from time delay unit $D_3$ causes generation of a $P_{N-2}$ pulse on line 47' at time t+(N−3)δ, which produces the $L_3$ output on line 63 of data $D_{j-2}$, at that time. The stage 2 delayed clock signal on line 78 from the time delay unit $D_2$ causes generation of a $P_{N-1}$ pulse on the line 48' at time t+(N−2)δ, which produces the $L_2$ output on the line 62 of data $D_{j-1}$ at that time.

Finally, the stage 1 delayed clock signal on line 79 from time delay unit $D_1$ causes generation of a $P_N$ pulse on line 49' at time t+(N−1)δ, which produces the $L_1$ output on line 61 of data $D_{j-}$, at that time.

This invention provides a significant area savings when the number of stages in the pipeline is greater than 2. For each additional stage, a single latch consumes approximately half the area of a conventional edge-triggered register. Also, there is no need to add scan ports to the latch bits, as they are already connected into a shift register.

The clock skew versus data path race condition is solved by design, using a regular structured array of latches and clock cells. The regularity of the logical structure allows the layout to be "compiled" (algorithmically generated) to any number of words times any number of bits.

As the number of words increases, however, the performance is degraded; the larger the number of words, the longer it takes to shift the words in the pipeline before the pipeline is ready to accept the next word. However, typical applications should allow 8–12 pipeline stages. If more pipeline stages were required than allowed by the application frequency, one would simply use another pipeline array, feeding the output data from one array directly into the input of the second array. Any number of arrays can be connected in such a manner to achieve any desired pipeline depth.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the following claims.

Having thus described the invention, what is claimed as new and desirable to be secured by Letters Patent is as follows:

1. A pipeline array comprising:
   a pipeline clock line for receiving a series of Pipeline Clock Pulses (PCP)s;
   a register having a register clock input, a register data input and a register data output;
   N Pulse Triggered Latch (PTL) stages with each PTL including N Latch Pulse Generators (LPG)s and N parallel sets of latches with a parallel set of single latches in each stage, where N is a positive integer, including at least a first PTL stage, a penultimate PTL stage, and a last PTL stage;
   each PTL stage including:
      a latch and an LPG;
      each LPG being adapted to generate a latch clock pulse and including a pipeline clock pulse input and an LPG pulse output;
      each latch including a latch data input, a latch data output, and a clock input connected to the LPG pulse output of the LPG with the LPG pulse output being connected to trigger the latch when the LPG is activated by activation of the pipeline pulse input;
   each latch data output being connected in series to a latch data input of a successive PTL stage except that the latch data output of the last PTL stage is connected as a pipeline data output, with the latch data input of the first PTL stage being connected to the register data output;

the pipeline clock line being connected to the register clock input and the pipeline clock pulse input of the LPG of the last PTL stage; and N−1 time delay units, with each of the time delay units being connected to the pulse input of an LPG except for the last PTL stage;

whereby the time delay units activate the LPGs in a bucket brigade fashion.

2. The pipeline array of claim 1 including:

the N−1 time delay units being connected in series with nodes connected therebetween;

each of the N−1 time delay units having a delay input and a delay output;

a first time delay unit, and a last time delay unit;

the delay input of the first time delay unit being connected to the pipeline clock line and the delay output of the first time delay unit being connected to the LPG of the penultimate PTL stage and the delay output of the last time delay unit being connected to the LPG of the first PTL stage.

3. The pipeline array of claim 2 wherein the delay output of one of the N−1 time delay units is connected to the pipeline clock pulse input of the LPG of each PTL stage from the penultimate PTL stage to the first PTL stage.

4. The pipeline array of claim 1 wherein:

the N−1 time delay units have N−1 time delay unit inputs and N−1 time delay unit outputs are connected in series; and the pipeline clock pulse input of each of the LPGs is connected to one of the N−1 time delay unit outputs aside from the last PTL stage.

5. The pipeline array of claim 1 wherein in each PTL stage:

the LPG of that PTL stage includes a dual input AND circuit, the AND circuit has a first input which is connected directly to the clock input of the latch of that PTL stage; and the AND circuit has a second input which is connected from the pipeline clock pulse input of that PTL stage through a LPG delay circuit and an inverter.

6. The pipeline array of claim 2 wherein: the LPG of that PTL stage includes a dual input AND circuit, the AND circuit has a first input which is connected directly to the clock input of the latch of that PTL stage; and the AND circuit has a second input which is connected from the pipeline clock pulse input of that PTL stage through a LPG delay circuit and an inverter.

7. The pipeline array of claim 3 wherein:

the LPG of that PTL stage includes a dual input AND circuit, the AND circuit has a first input which is connected directly to the clock input of the latch of that PTL stage; and the AND circuit has a second input which is connected from the pipeline clock pulse input of that PTL stage through a LPG delay circuit and an inverter.

8. The pipeline array of claim 4 wherein:

the LPG of that PTL stage includes a dual input AND circuit, the AND circuit has a first input which is connected directly to the clock input of the latch of that PTL stage; and the AND circuit has a second input which is connected from the pipeline clock pulse input of that PTL stage through a LPG delay circuit and an inverter.

9. The pipeline array of claim 1 wherein each of the N−1 delay units comprises a series connection of a pair of inverters.

10. The pipeline array of claim 2 wherein each of the N−1 delay units comprises a series connection of a pair of inverters.

11. The pipeline array of claim 3 wherein each of the N−1 delay units comprises a series connection of a pair of inverters.

12. A system comprising:

a pipeline clock generator for generating a series of wide Pipeline Clock Pulses (PCP)s;

a pipeline clock line for receiving the series of PCPs;

a register having a register clock input, a register data input and a register data output, N Narrow Pulse Triggered Latch (NPTL) stages including N Latch Pulse Generators (LPG)s and N parallel sets of latches with a parallel set of single latches in each stage, where N is a positive integer, including at least a first NPTL stage, a penultimate NPTL stage, and a last NPTL stage;

each NPTL stage including:

a latch and an LPG;

the LPG being adapted to generate a latch clock pulse and including a pipeline clock pulse input and an LPG pulse output;

the latch including a latch data input, a latch data output, and a clock input which is connected to the LPG pulse output of the LPG with the LPG pulse output being connected to trigger the latch when the LPG is activated by activation of the pipeline pulse input;

each latch data output being connected in series to a latch data input of a successive NPTL stage except that the latch data output of the last NPTL stage is connected as a pipeline data output, with the latch data input of the first NPTL stage being connected to the register data output;

the pipeline clock line being connected to the register clock input and the pipeline clock pulse input of the LPG of the last NPTL stage; and N−1 time delay units, with each of the time delay units being connected to the pulse input of an LPG except for the last NPTL stage;

whereby the time delay units activate the LPGs in a bucket brigade fashion.

13. The pipeline array of claim 12 including:

the N−1 time delay units being connected in series with nodes which are connected therebetween;

each of the N−1 time delay units having a delay input and a delay output;

a first time delay unit, and a last time delay unit;

the delay input of the first time delay unit being connected to the pipeline clock line and the delay output of the first time delay unit being connected to the LPG of the penultimate NPTL stage and the delay output of the last time delay unit being connected to the LPG of the first NPTL stage.

14. The pipeline array of claim 13 wherein the delay output of one of the N−1 time delay units is connected to the pipeline clock pulse input of the LPG of each NPTL stage from the penultimate NPTL stage to the first NPTL stage.

15. The pipeline array of claim 12 wherein:
the N–1 time delay units have N–1 time delay unit inputs and N–1 time delay unit outputs which are connected in series; and
the pipeline clock pulse input of each of the LPGs is connected to one of the N–1 time delay unit outputs aside from the last NPTL stage.

16. The pipeline array of claim 12 wherein in each NPTL stage:
the LPG of each NPTL stage includes a dual input AND circuit,
the AND circuit has a first input which is connected directly to the clock input of the latch of that NPTL stage; and
the AND circuit has a second input which is connected from the pipeline clock pulse input of that NPTL stage through a LPG delay circuit and an inverter.

17. The pipeline array of claim 13 wherein:
the LPG of that NPTL stage includes a dual input AND circuit,
the AND circuit has a first input connected directly to the clock input of the latch of that NPTL stage; and
the AND circuit has a second input connected from the pipeline clock pulse input of that NPTL stage through a LPG delay circuit and an inverter.

18. The pipeline array of claim 14 wherein:
the LPG of that NPTL stage includes a dual input AND circuit,
the AND circuit has a first input which is connected directly to the clock input of the latch of that NPTL stage; and
the AND circuit has a second input which is connected from the pipeline clock pulse input of that NPTL stage through a LPG delay circuit and an inverter.

19. The pipeline array of claim 15 wherein:
the LPG of that NPTL stage includes a dual input AND circuit,
the AND circuit has a first input which is connected directly to the clock input of the latch of that NPTL stage; and
the AND circuit has a second input which is connected from the pipeline clock pulse input of that NPTL stage through a LPG delay circuit and an inverter.

20. A pipeline array comprising:
a pipeline data input, a pipeline data output, and a pipeline clock line;
a pipeline clock pulse generator for generating a series of wide Pipeline Clock Pulses (PCP)s being connected to the pipeline clock line;
an input register has a register data input that is connected to the pipeline data input;
the input register also has a register data output, and a register clock input which is connected to the pipeline clock line;
N Narrow Pulse Triggered Latch (NPTL) stages with N sets of parallel single latches, with a set of parallel single latches in each stage, N Latch Pulse Generators (LPG)s and N–1 time delay units, where N is a positive integer;
each of the NPTL stages comprising a single latch having with a latch data input, a latch data output and a latch clock input and a Latch Pulse Generators (LPG) with each LPG having an LPG input and an LPG output, the LPG output being connected to the latch clock input of that NPTL;
each LPG being adapted to provide a narrow trigger pulse in response to a PCP;
the N NPTL stages including a first NPTL stage and a last NPTL stage;
the register data output being connected to the latch data input of the first NPTL stage;
the N latch stages being connected in series with the latch data output of each previous NPTL stage being connected to the latch data input of a successive NPTL stage except for the last NPTL stage, which is connected to the pipeline data output;
N–1 time delay units connected in series to provide delayed clock signals to the LPGs except for the last NPTL stage;
the LPG input of the last NPTL stage being connected to the pipeline clock line; and
whereby the time delay units activate the LPGs to transfer data from a preceding NPTL stage to a successive NPTL stage in a bucket brigade fashion starting with the last NPTL stage and ending with the first NPTL stage during a single pipeline clock pulse.

* * * * *